July 9, 1963 E. K. DOMBECK ETAL 3,096,648
QUICK CHECK MASTER CYLINDER FILLER CAP
Filed May 18, 1960
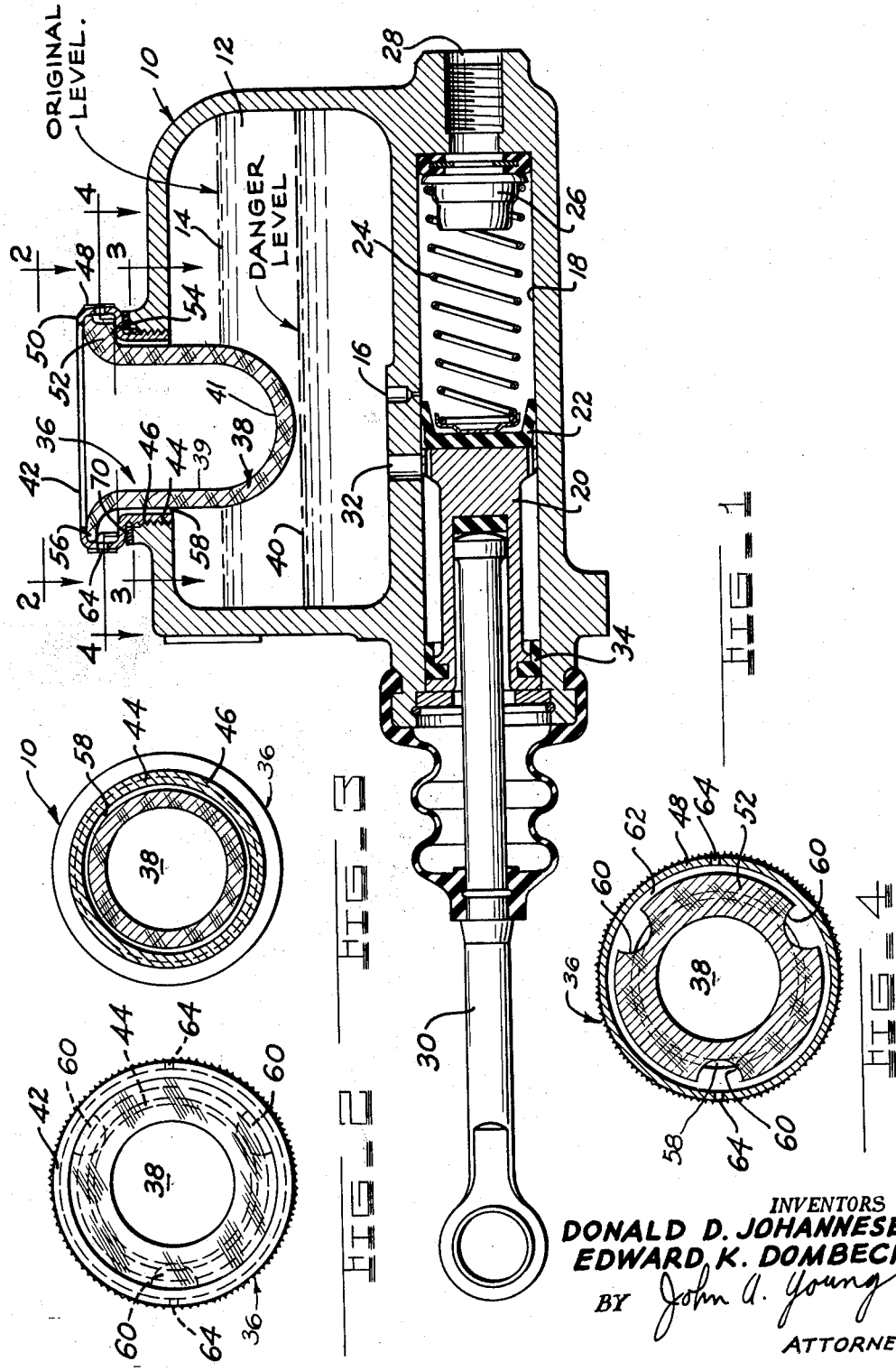
INVENTORS
DONALD D. JOHANNESEN
EDWARD K. DOMBECK
BY John A. Young
ATTORNEY.

United States Patent Office 3,096,648
Patented July 9, 1963

3,096,648
QUICK CHECK MASTER CYLINDER FILLER CAP
Edward K. Dombeck and Donald D. Johannesen, South Bend, Ind., assignors to The Bendix Corporation, a corporation of Delaware
Filed May 18, 1960, Ser. No. 29,945
1 Claim. (Cl. 73—334)

This invention relates to a master cylinder filler cap which is useful for visually checking the contents of the master cylinder reservoir but without removing the master cylinder filler cap.

In a hydraulic braking system, in the event of failure of one of the brake lines, fittings, seals or the like hydraulic fluid can be drained from the reservoir and when the operator then applies the brakes, it is discovered that they are inoperative. This is an obvious hazard, which can only be prevented by proper functioning of the brake parts or by providing a quick and reliable means for convenient checking of the hydraulic fluid within the reservoir of the master cylinder to determine whether the reservoir is adequately charged with fluid. In the event of hydraulic loss in the reservoir, the operator is alerted to the fact that the fluid must be replenished and the system checked for leakage.

It is one of the objects of the present invention to provide a simple, economical means for visual checking of the master cylinder reservoir through the master cylinder filler cap, but without requiring removal of the master cylinder filler cap. It is hoped in this manner that routine checking of the hydraulic fluid might be promoted.

It is a further object of the invention that the master cylinder filler cap so described, will be capable of admitting air into the reservoir in order to compensate for fluid which is withdrawn during usage so that subatmospheric pressures do not develop within the reservoir sucking the fluid back from the brake lines and causing a vacuum in the brake lines.

Other objects and features of the invention will become apparent from a consideration of the following description which proceeds with reference to the accompanying drawings, wherein:

FIGURE 1 is a section view taken through the master cylinder and master cylinder filler cap and indicating various levels of hydraulic fluid within the reservoir;

FIGURE 2 is a top view of the master cylinder filler cap shown removed from the master cylinder reservoir; and FIGURES 3 and 4 are section views taken on section lines 3—3 and 4—4 of FIGURE 1.

In FIGURE 1, the master cylinder housing 10 includes a fluid reservoir 12 which is filled at the time of charging to a level 14, the fluid is communicated through a compensating port 16 to a master cylinder bore 18 wherein there is located piston 20 having cup 22 at its forward face. The piston 20 is removed toward the right against the resistance of spring 24, the compensating port 16 being covered by the cup 22 and the fluid is forced past a one-way check valve 26 (construction of the check valve is not a part of the present invention, and for one of several check valves which are usable, reference may be made to U.S. Patent 2,789,578 issued April 23, 1957) which permits fluid to pass from the cylinder 18 to the brake line 28 where it is communicated with the brakes. The check valve 26 resists return of the fluid from the brake line 28 in accordance with the resistance of spring 24. The piston 20 is operated by means of a rod 30 which is connected to a foot operated pedal or the like (not shown). As the piston 20 is reciprocated, a breather port 32 allows fluid from the reservoir to pass behind the head of piston 20.

It will be seen, that if there should develop a leak in any of several different parts of the system, as for example seal 34, the entire fluid content of the reservoir 12 could be drained from the reservoir and at the next application of the brakes, movement of piston 20 would be ineffective for developing a pressure capable of applying the brake. It is to protect against exigencies of this type, that there should be available to the person servicing the car, a ready means for checking the level of fluid within the reservoir 12 to determine whether the motorist's brakes are in safe operating condition. According to the present invention, the master cylinder filler cap designated generally by reference numeral 36 is constructed of a cup shaped glass member 38 which is hollow and comprises an annular wall 39 closed at one end thereof by a dome-shaped portion. Member 38 is inverted to extend within the reservoir 12 and below the level 14 of the fluid so long as the fluid is in appropriate quantities. The cup shaped member 38 is made of glass and is transparent or at least translucent so that the level of the fluid 12 will be apparent because of the watermark which it makes on the member 38 by creating a discoloration of 38 or by being directly open to view at the point of contact with 38. Glass is not the only suitable material of construction for the cup shaped member 38; any non-opaque material which is impervious to the hydraulic fluid 12 is acceptable. The level of fluid in the reservoir is determined by contact with the outer surface of member 38 and if the level of fluid in the reservoir should drop below level 40 to be out of contact with member 38, then this indicates the need for hydraulic fluid replacement in the reservoir. Although the sides of the member 38 are not graduated, it is possible to graduate the walls to give an accurate quantitative measure of the fluid content of the reservoir. This means, of course, that a given master cylinder filler cup must be graduated to the capacity of the reservoir.

It is an important feature of the invention, that checking the hydraulic fluid content of the reservoir can be accomplished without removal of the master cylinder filler cap. For example, the operator needs only to sight within the interior of the cup shaped member 38 and note where the hydraulic fluid contacts the outer surface of the member 38. It would be immediately apparent, where the fluid level is, since the fluid is directly visible through the transparent (or translucent) walls of member 38 to provide an indication of the level of the fluid. If the fluid is not at a sufficient level for contacting the outer surface of the cup shaped member 38, then this provides immediate indication that fluid servicing is required. If the cup shaped member 38 has become soiled it can be easily cleaned by inserting a wiping cloth within the glass.

The cup shaped member 38 is mounted by means of a metallic retainer 42 which has a threaded sleeve 44 received within a threaded opening 46 of the reservoir. The retaining member 42 includes an annular portion 48 which is bent over at its end 50 to form a recess for and clamp circular glass flange 52 against seat 54. A bead 56 of the glass flange 52 serves to locate the sleeve 44 and member 38 in concentric relation and the diameter of the wall 39 of the cup shaped member 38 is proportioned relatively to the diameter of sleeve 44 so that a clearance 58 exists between the member 38 and sleeve 44 providing an air gap between the sleeve 44 and the outer surface of the wall 39. A number of semi-circular indentations 60 are constructed within flange 52 to provide communication with air gap 58 past seat 54, there being a second air gap 62 between portion 48 and flange 52, as shown in FIGURE 4 so that breather openings 64 allow air to pass freely within the reservoir through gap 62, indentations 60, air gap 58 to the reservoir. Air pressure within the reservoir, is therefore maintained at atmospheric pressure at all times and since the subatmospheric pressure cannot develop within the reservoir, then air will not be sucked into the hydraulic lines through the wheel cylinders or at any other point in the fluid system, from this cause. The clearance between the wall 39 and sleeve 44 acts as a baffle preventing loss of fluid under conditions of surge or turbulence within the reservoir.

The outer surface of retainer 48 may be serrated to facilitate gripping of the master cylinder filler cap and screwing it and unscrewing it from its seated position within the master cylinder 10.

In use, the master cylinder filler cap functions just as any conventional master cylinder filler cap except that, it can be used for the additional purpose of checking the hydraulic fluid content of the reservoir and without removal of the filler cap. The checking can be done easily, by merely sighting within the cup shaped member 38 and noting where the fluid comes along the side of the member 38 either because of change in the color of the side 38 or by a direct view of the fluid contacting the outer surface of 38. Little or no distortion will be obtained by sighting the fluid when the fluid is in direct contact with the outer surface of cup shaped member 38 which is the case when the cup shaped member projects below the surface of the fluid; and when the cup shaped member does not so project below the fluid, then this is the indication that fluid replenishment is necessary.

Between the opening of the master cylinder and the cup, there my be provided a sealing gasket 70 or the like which will prevent leakage of fluid through the filler opening 46 of the master cylinder. The path by which fluid is vented into the reservoir, includes small diameter breather openings 64 and the gap 58 is sufficiently small, so that fluid cannot easily splash upwardly from the reservoir and find its way out of the reservoir through the filler cap. The filler cap, thus serves its various functions of (1) maintaining the hydraulic fluid within the reservoir, (2) providing an inflow of atmospheric air to replace such fluid as is withdrawn from the reservoir, in order to bring atmospheric pressure conditions within the reservoir and (3) serving as a ready means of checking the quantity of fluid in the master cylinder but without removal of the filler cap.

Although the present invention has been described in connection with but a single example embodiment, it will be understood that this is merely an illustration of the invention and it is assumed, that those skilled in the art, can make numerous adaptations and revisions of the example embodiment to suit individual requirements. It is intended, that such revisions and variations as are reasonably to be expected on the part of those skilled in the art, and which incorporate the herein disclosed principles, will be included in the scope of the following claim as equivalents of the invention.

What is claimed is:

A cap comprising two members: one of said members being closed at the lower end thereof and open at the upper end thereof, said one member having an annular wall with a dome portion closing the lower end thereof and with an outwardly extending annular flange at the upper end thereof, at least one indentation in the bottom face of said flange and extending from the outer surface of said annular wall to the outer periphery of said flange, said one member being transparent, the other of said members comprising an annular wall at the bottom end and an annular inwardly facing recessed portion at the upper end thereof for receiving said flange, the outer surface of said last mentioned annular wall having threads thereon, the portion of said second member forming said annular recess having at least one breather port therein; said two members being so assembled that the outer periphery of said flange fits within said annular recess and the upper and lower face of said flange is clamped by the portion of said second member forming said annular recess and the outer surface of the annular wall of said first member is spaced from the inner surface of said annular wall of said second member whereby the last named space is communicated with said breather port via said indentation.

References Cited in the file of this patent
UNITED STATES PATENTS

| 1,883,971 | Kryzanowsky | Oct. 25, 1932 |
| 2,554,557 | Brown et al. | May 29, 1951 |
| 2,616,941 | Lasko | Nov. 4, 1952 |

FOREIGN PATENTS

| 275,467 | Germany | June 18, 1914 |
| 849,909 | Germany | Sept. 18, 1952 |
| 50,978 | Switzerland | Mar. 11, 1911 |